United States Patent
Oroskar et al.

(10) Patent No.: US 9,801,116 B1
(45) Date of Patent: Oct. 24, 2017

(54) WIRELESS COMMUNICATION SYSTEM CONTROL OF CARRIER AGGREGATION FOR A WIRELESS RELAY

(71) Applicant: Sprint Communications Company L.P., Overland Park, KS (US)

(72) Inventors: Siddharth Oroskar, Overland Park, KS (US); Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/361,901

(22) Filed: Nov. 28, 2016

(51) Int. Cl.
| | | |
|---|---|---|
| H04B 7/15 | (2006.01) | |
| H04B 7/14 | (2006.01) | |
| H04B 17/02 | (2006.01) | |
| H04W 40/22 | (2009.01) | |
| H04L 5/00 | (2006.01) | |
| H04L 12/26 | (2006.01) | |
| H04W 28/14 | (2009.01) | |
| H04W 88/08 | (2009.01) | |
| H04W 88/04 | (2009.01) | |

(52) U.S. Cl.
CPC .......... *H04W 40/22* (2013.01); *H04L 5/0016* (2013.01); *H04L 43/16* (2013.01); *H04W 28/14* (2013.01); *H04W 88/04* (2013.01); *H04W 88/08* (2013.01)

(58) Field of Classification Search
CPC ..................................................... H04W 40/22
USPC ........................................ 455/11.1, 7, 9, 16
See application file for complete search history.

(56) References Cited

U.S. PATENT DOCUMENTS

| | | |
|---|---|---|
| 8,842,652 B2 | 9/2014 | Kovacs et al. |
| 8,929,275 B2 | 1/2015 | Zhang et al. |
| 9,019,836 B2* | 4/2015 | Klingenbrunn ....... H04W 28/12 370/236 |
| 9,226,272 B2 | 12/2015 | Lee et al. |
| 2009/0196177 A1 | 8/2009 | Teyeb et al. |
| 2009/0207730 A1 | 8/2009 | Stamoulis et al. |
| 2011/0261747 A1 | 10/2011 | Wang et al. |
| 2012/0002643 A1 | 1/2012 | Chung et al. |
| 2015/0003418 A1 | 1/2015 | Rosa et al. |
| 2017/0111952 A1* | 4/2017 | Choi ..................... H04W 72/04 |

* cited by examiner

*Primary Examiner* — Tilahun B Gesesse

(57) ABSTRACT

A wireless communication network controls Carrier Aggregation (CA), a donor base station wirelessly serves a wireless relay and the donor base station and the wireless relay wirelessly serve User Equipment (UE). The wireless relay wirelessly exchanges user data with a UE using CA based on an initial relay to UE (R2UE) CA threshold. The donor base station determines a donor base station utilization amount and processes the donor base station utilization amount to determine a modified R2UE CA threshold. The donor base station wirelessly transfers an instruction to the wireless relay indicating the modified R2UE CA threshold. The wireless relay wirelessly receives the modified R2UE CA threshold and exchanges additional user data with the UE using CA based on the modified R2UE CA threshold.

20 Claims, 8 Drawing Sheets

WIRELESS COMMUNICATION SYSTEM CONTROL OF CARRIER AGGREGATION FOR A WIRELESS RELAY

TECHNICAL BACKGROUND

Wireless communication systems transfer data packets between User Equipment (UE) to provide data communication services, like internet access, voice calls, media streaming, user messaging, among other communication services. Wireless communication systems allow users to move about and communicate over the air with access communication.

Some wireless communication systems use Orthogonal Frequency Division Multiplexing (OFDM) to exchange wireless data with UEs. In OFDM communication systems, resource blocks are used to transfer data simultaneously over various time slots and frequency carriers. One popular wireless communication system that uses the resource block allocation scheme of OFDM communication systems is Long Term Evolution (LTE) communication networks.

A wireless communication system may employ Carrier Aggregation (CA). CA allows communication networks to use multiple resource blocks simultaneously for a UE. A UE uses CA to increase data throughput and transmission speeds to a wireless access point. Wireless communication systems can aggregate carriers over various frequency bands using Intra-Band Contiguous CA, Intra-Band Non-Contiguous CA, and Inter-Band CA. Intra-Band Contiguous CA uses component carriers that are in the same frequency band and are adjacent to each other. Intra-Band Non-Contiguous CA uses component carriers that are in the same frequency band but are not adjacent to each other. Inter-Band CA uses component carriers that are in different frequency bands.

To expand or enhance the wireless signal coverage of a wireless communication network, wireless communication relays are added to locations not adequately covered by current network infrastructure. A relay exchanges wireless signaling and data between UEs and another wireless access point. Without the signal repetition provided by the wireless relay, the coverage area of the wireless access point may otherwise have not extended far enough to serve the UEs using the relay. Thus, a wireless relay provides a less resource intensive means for increasing wireless network coverage. Wireless relays typically backhaul traffic through a communication link to a donor base station.

CA configurations for relays and UEs may be set up upon attachment or be activated and deactivated based on CA thresholds, such as a buffer occupancy threshold and secondary cell Modulation and Coding Scheme (MCS) index threshold. While providing CA to both relays and UEs may allow a higher throughput rate, this may also lead to a limited number of resources available to wireless access points serving additional relays and UEs. Unfortunately, existing techniques of controlling CA between a wireless relay and a UE based on CA thresholds are neither effective nor efficient.

Technical Overview

A wireless communication network controls Carrier Aggregation (CA), wherein a donor base station wirelessly serves a wireless relay and the donor base station and the wireless relay wirelessly serve User Equipment (UE). The wireless relay wirelessly exchanges user data with a UE using CA based on an initial relay to UE (R2UE) CA threshold. The donor base station determines a donor base station utilization amount and processes the donor base station utilization amount to determine a modified R2UE CA threshold. The donor base station wirelessly transfers an instruction to the wireless relay indicating the modified R2UE CA threshold. The wireless relay wirelessly receives the modified R2UE CA threshold and exchanges additional user data with the UE using CA based on the modified R2UE CA threshold.

DETAILED DESCRIPTION

Figure 1:
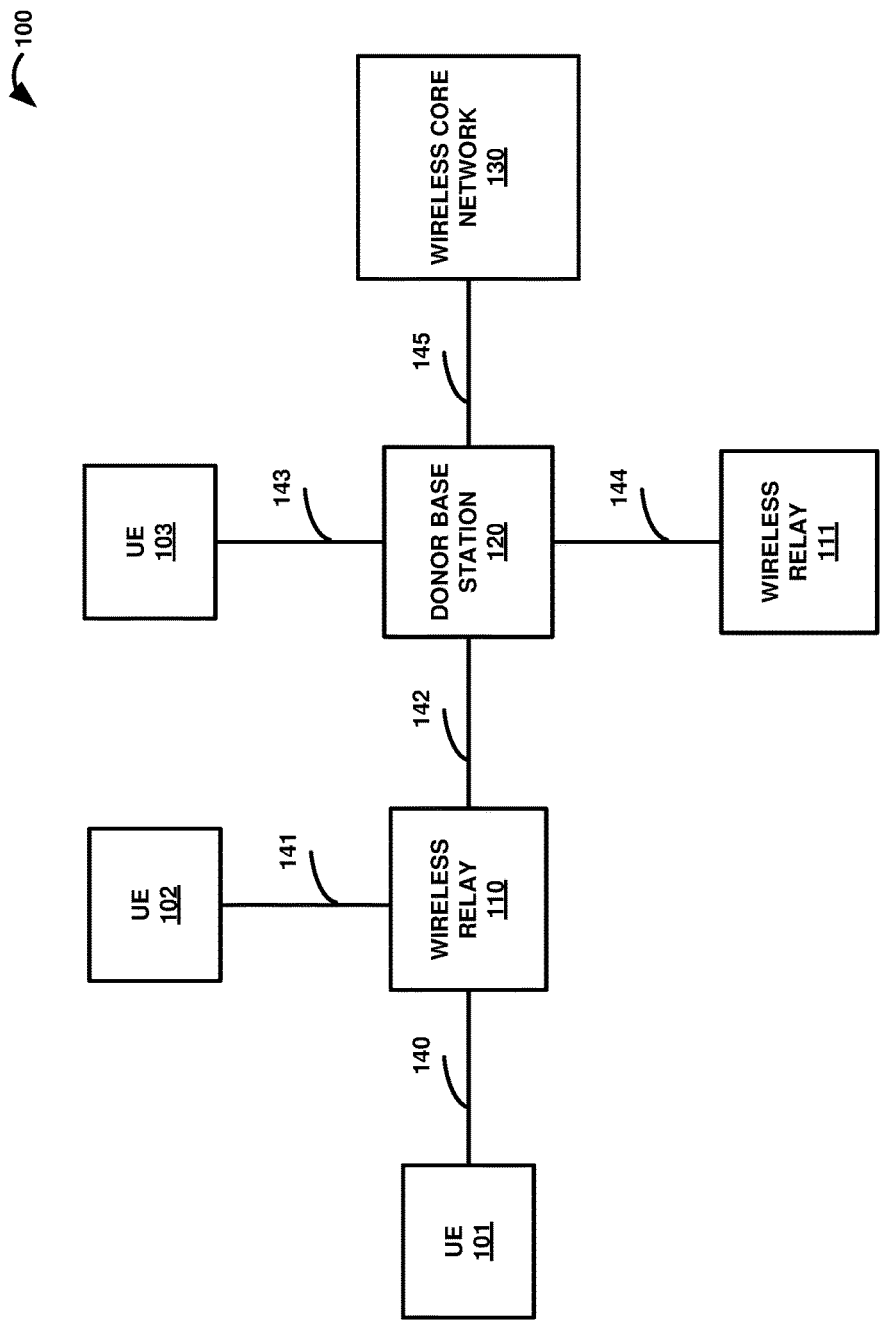
FIGS. 1-3 illustrate a wireless communication system to control Carrier Aggregation (CA).
Figure 2:
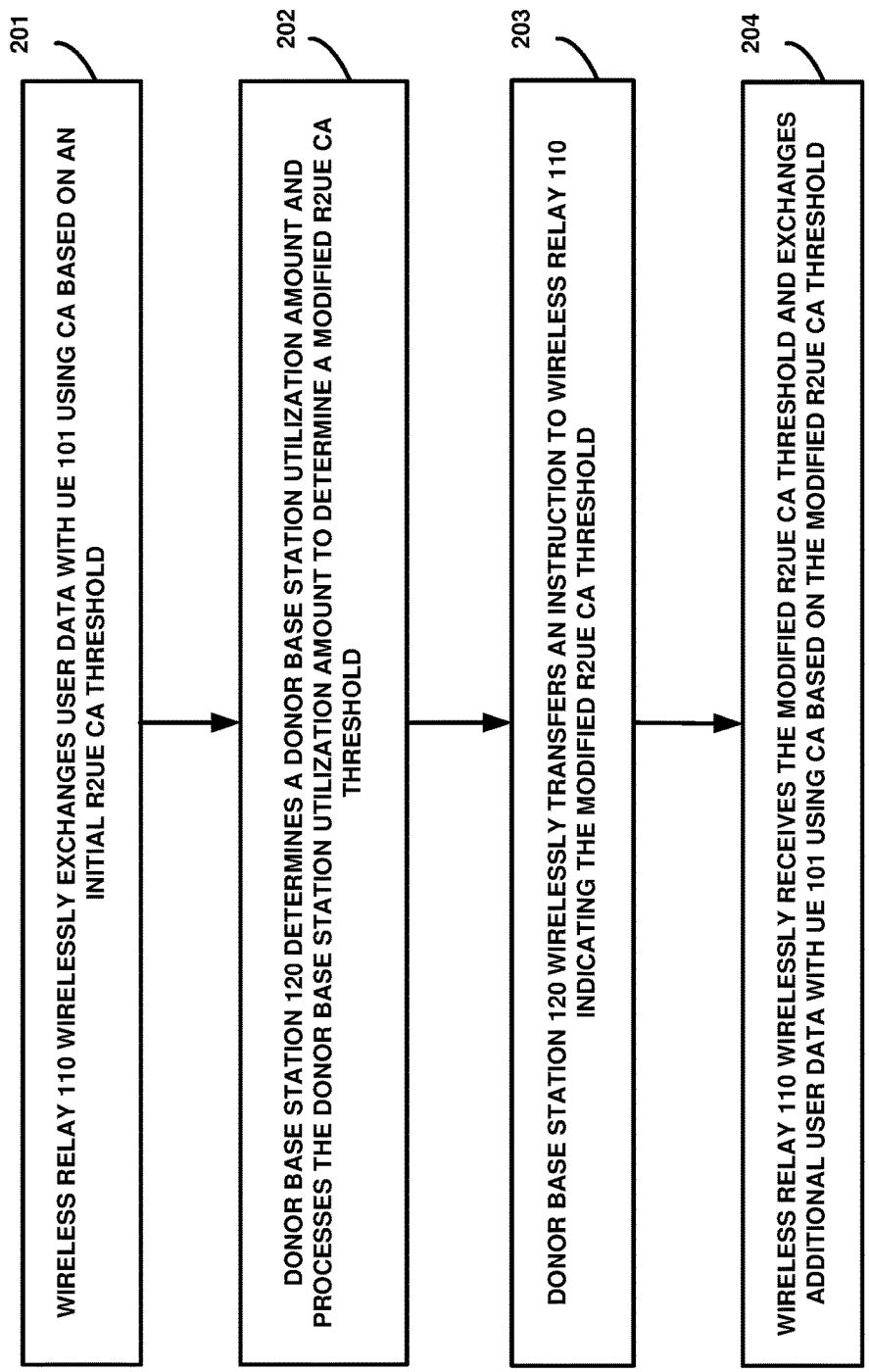
Figure 3:
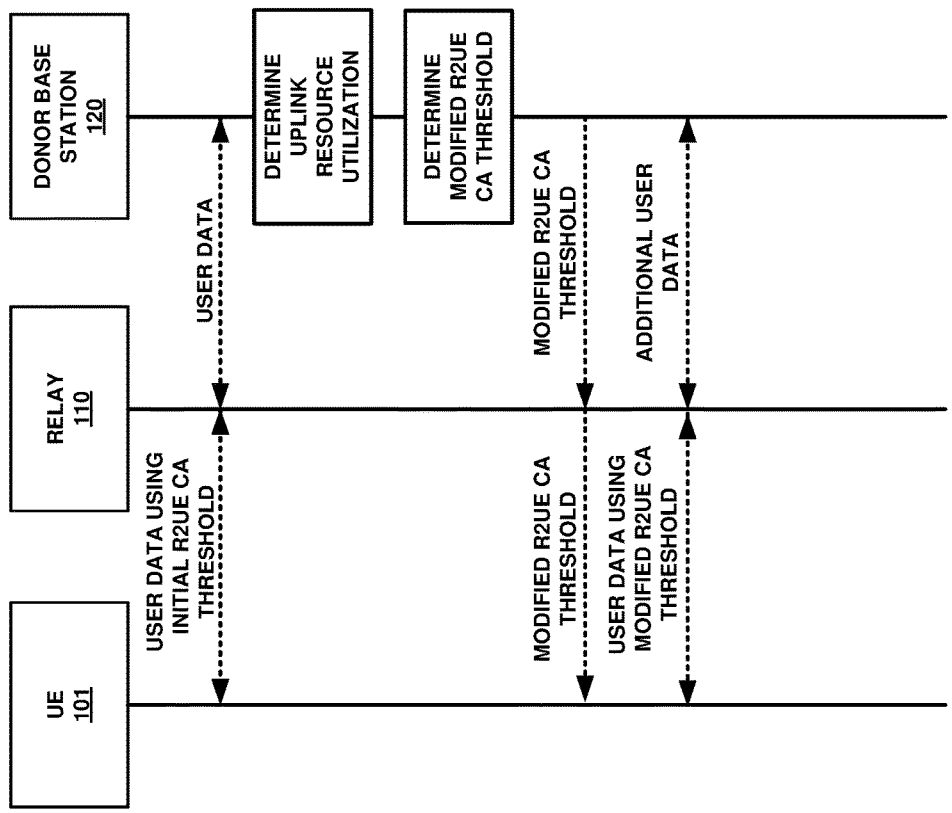

FIGS. 1-3 illustrate wireless communication system 100 to control Carrier Aggregation (CA). Wireless communication system 100 transfers data between various User Equipment (UEs) to provide data communication services, like internet access, media streaming, voice calls, user messaging, among other services. Referring to FIG. 1, wireless communication system 100 comprises UEs 101-103, wireless relays 110-111, donor base station 120, and wireless core network 130.

UE 101 communicates with wireless relay 110 over wireless link 140. UE 102 communicates with wireless relay 110 over wireless link 141. Wireless relay 110 communicates with donor base station 120 over wireless link 142. UE 103 communicates with donor base station 120 over wireless link 143. Wireless relay 111 communicates with donor base station 120 over wireless link 144. Donor base station 120 communicates with wireless core network 130 over communication link 145.

UEs 101-103 could be a phone, tablet computer, media device, intelligent machine, or some other apparatus having a wireless communication transceiver. UEs 101-103 include processing circuitry and communication transceivers, such as antennas, ports, bus interfaces, signal processors, memory that store and execute various software modules. UEs 101-103 are capable to using CA for exchanging data with wireless relay 110 and donor base station 120. CA allows UEs 101-103 to exchange a greater amount of data over a shorter period by scheduling multiple resource blocks.

Wireless relays 110-111 may comprise an evolved NodeB (eNodeB), a mini-macro cell, a femtocell, a picocell, or some other wireless base station capable of providing wireless communication services to UEs. Donor base station 120 may comprise a macro base station, a wireless hotspot, an eNodeB, or some other base station that may provide wireless communication services to UE 103 directly and UEs 101-102 over wireless relay 110. Wireless relays 110-111 and donor base station 120 each include communication interfaces, microprocessors, storage systems, or some other processing systems or software systems, and may be distributed among multiple devices.

Wireless relays 110-111 and donor base station 120 may be configured to provide wireless coverage to one or more UEs for voice calls, media streaming, internet access, text messages, and the like. Wireless relay 110 is capable of transferring user data to UEs 101-102 using relay to UE (R2UE) CA. Donor base station 120 is capable of transferring user data to wireless relays 110-111 using donor base station to relay (D2R) CA and user data to UE 101 using donor base station to UE (D2UE) CA.

Wireless core network 130 comprises computer equipment with software, such as packet gateways, network controllers, authorization databases, and the like. In some examples, wireless core network 130 comprises an LTE or System Architecture Evolution (SAE) core. The LTE/SAE core typically includes Serving Gateways (S-GWs), Mobility Management Entities (MMEs), Home Subscriber Systems (HSS), Packet Data Network Gateways (P-GWs), and Policy Charging Rules Functions (PCRFs).

Wireless links 140-144 may use air or space to transport media. Wireless links 140-144 may use protocols, such as Long Term Evolution (LTE), Orthogonal Frequency Division Multiplexing (OFDM), Code Division Multiple Access (CDMA), LTE Wireless Aggregation (LWA), Internet Protocol (IP), Wireless Fidelity (WiFi), or some other wireless communication format—including combinations thereof.

Communication link 145 may use metal, glass, optics, air, space, or some other material as the transport media. Communication link 145 may use Time Division Multiplexing (TDM), IP, Ethernet, Synchronous Optical Networking (SONET), communication signaling, wireless communications, or some other communication format—including improvements thereof. Communication link 145 may be a direct link, or can include intermediate networks, systems, or devices, and can include a logical network link transported over multiple physical links.

In operation, wireless relay 110 exchanges user data with UE 101 using CA based on an initial R2UE CA threshold. User data may include attachment and registration information to establish signaling between UE 101 and wireless core network 130 over wireless relay 110 and donor base station 120. Wireless relay 110 may comprises a wireless relay UE (RE) and a wireless relay eNodeB. The RE in wireless relay 110 may exchange user data for UE 101 with donor base station 120 using D2R CA. The eNodeB in wireless relay 110 may exchange user data with UE 101 using R2UE CA.

The initial R2UE CA threshold may be used to control CA on an uplink from UE 101 to wireless relay 110. The initial R2UE CA threshold may also be used to control CA on the downlink from wireless relay 110 to UE 101. In some examples, the initial R2UE CA threshold comprises an initial buffer occupancy threshold for CA which determines the minimum buffer occupancy required to activate CA between wireless relay 110 and UE 101. In other examples, the initial R2UE CA threshold may include an initial Modulation and Coding Scheme (MCS) threshold which determines the minimum MCS index threshold of a secondary cell required to deactivate a secondary cell. In other examples, the initial R2UE CA threshold may be an initial Channel Quality Indicator (CQI) threshold.

Donor base station 120 determines a donor base station utilization amount and processes the donor base station utilization amount to determine a modified R2UE CA threshold. The donor base station utilization amount may be determined for an uplink resource usage on donor base station 120, such as a Physical Uplink Shared Channel (PUSCH) usage amount and a Physical Uplink Control Channel (PUCCH) usage amount. The donor base station utilization amount may also be determined for a downlink resource usage on donor base station 120, such as a Physical Downlink Shared Channel (PDSCH) usage amount and a Physical Downlink Control Channel (PDCCH) usage amount.

The modified R2UE CA threshold is a threshold wireless relay 110 uses to determine CA activation and CA deactivation for UEs 101-102. The modified R2UE CA threshold may be a modification of an uplink R2UE CA threshold or a downlink R2UE CA threshold. In some examples, the modified R2UE CA threshold comprises a modified buffer occupancy threshold for CA. In other examples, the modified R2UE CA threshold may include a modified MCS index threshold for CA. In other examples, the modified R2UE CA threshold may be a modified CQI threshold for CA.

Donor base station 120 wirelessly transfers an instruction to wireless relay 110 indicating the modified R2UE CA threshold. The instruction may be transferred from donor base station 120 to the RE in wireless relay 110. The RE in wireless relay 110 may then transfer the modified R2UE CA threshold to the eNodeB in wireless relay 110. The eNodeB in wireless relay 110 may then use the modified R2UE CA threshold to determine new CA configurations for UEs 101-102. In some examples, the RE in wireless relay 110 may transfer the modified R2UE CA threshold to the eNodeB in wireless relay 110 over an Ethernet link. The RE in wireless relay 110 may wirelessly receive the instruction indicating the modified R2UE CA threshold from donor base station 120 over a Radio Resource Control (RRC) link, an X2 link, an Ethernet link, and the like.

In response to receiving the modified R2UE CA threshold, wireless relay 110 exchanges additional user data with UE 101 using CA based on the modified R2UE CA threshold. Wireless relay 110 may determine a new CA configuration for UE 101 based on the modified R2UE CA threshold by determining a new resource block allocation schedule. The CA for UE 101 based on the modified R2UE CA threshold may include activation of additional carriers allocated to UE 101, deactivation of a percentage of the carriers allocated to UE 101, or complete disablement of CA for UE 101. Advantageously, this allows optimal resource allocation management for wireless relay 110 serving additional wireless relays and UEs which may result in better utilization of backhaul resources and uplink/downlink throughput for the sector served by donor base station 120.

FIG. 2 is a flow diagram illustrating an operation of wireless communication system 100 to control CA. Wireless relay 110 exchanges (201) user data with UE 101 using CA based on an initial R2UE CA threshold. Donor base station 120 determines (202) a donor base station utilization amount and processes (202) the donor base station utilization amount to determine a modified R2UE CA threshold. Donor base station 120 wirelessly transfers (203) an instruction to wireless relay 110 indicating the modified R2UE CA threshold. Wireless relay 110 wirelessly receives (204) the modified R2UE CA threshold and exchanges (204) additional user data with UE 101 using CA based on the modified R2UE CA threshold.

FIG. 3 is a sequence diagram illustrating the operation of wireless communication system 100 to control CA. Wireless relay 110 exchanges user data with UE 101 using CA based on an initial R2UE CA threshold. For example, donor base station 120 may receive user data and relay backhaul data from wireless core network 130.

Donor base station 120 determines a donor base station utilization amount and processes the donor base station utilization amount to determine a modified R2UE CA threshold. For example, donor base station 120 may determine PUSCH and PUCCH utilization is increasing due to the additional uplink Acknowledgement (ACK)/Negative Acknowledgements (NACK) being used for UE 103 uploading video streaming data, wireless relay 111 transferring backhaul data, and UEs 101-102 transferring VoLTE user data over wireless relay 110. Donor base station 120 then processes donor base station uplink utilization amount to determined that wireless relay 110 requires a modified R2UE CA threshold to limit the CA capability of UEs 101-102 served by wireless relay 110. Donor base station 120 then wirelessly transfers an instruction to wireless relay 110 indicating the modified R2UE CA threshold.

Wireless relay 110 wirelessly receives the modified R2UE CA threshold and exchanges additional user data with the UE using CA based on the modified R2UE CA threshold. For example, wireless relay 110 may receive the instruction indicating the modified buffer occupancy threshold and deactivate carriers for UEs 101-102 if the current buffer occupancy level is above the modified buffer occupancy threshold.

Figure 4:
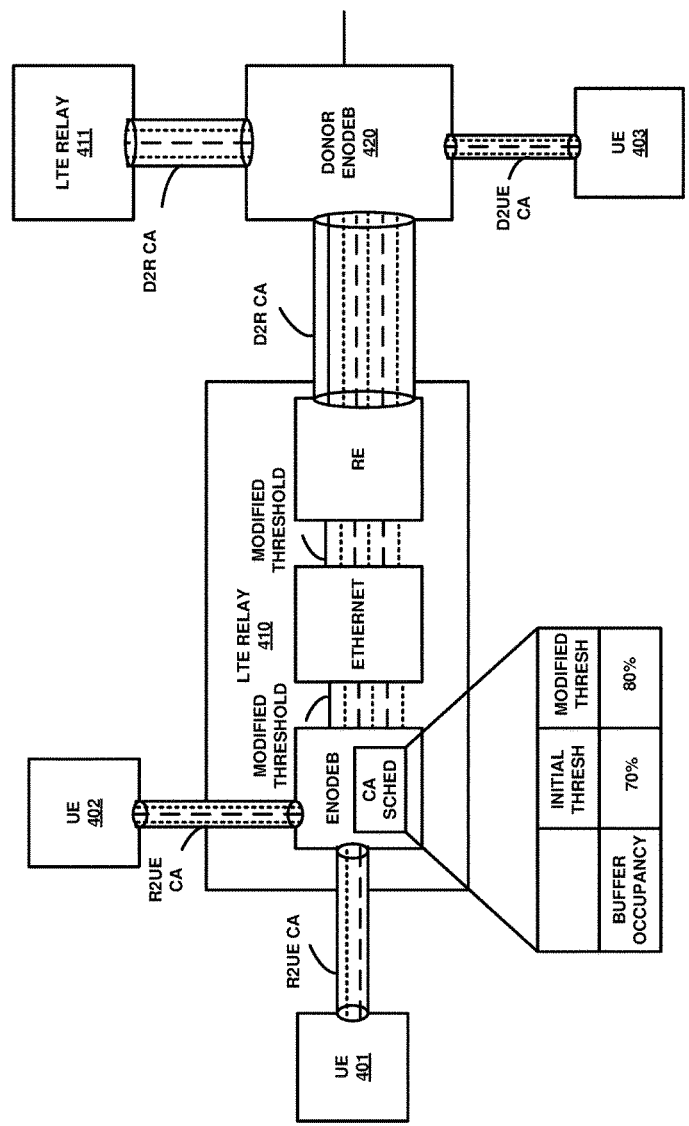
FIGS. 4-5 illustrate a Long Term Evolution (LTE) communication system to control CA.

FIG. 4 illustrates Long Term Evolution (LTE) communication system 400 to control CA. LTE communication system 400 is an example of communication system 100, although communication system 100 may use alternative configurations and operations. LTE communication system 400 includes UEs 401-403, LTE wireless relays 410-411, and donor eNodeB 420. UEs 401-402 exchange data and signaling with LTE relay 410 using R2UE CA over Radio Frequency (RF) communication links. UE 403 exchanges data and signaling with donor eNodeB 420 using D2UE CA over RF communication links. LTE relays 410-411 communicate with donor eNodeB 420 using D2UE CA over an X2 interface link.

LTE relay 410 comprises a relay eNodeB, an Ethernet switch, and an RE. The RE includes processing circuitry and memory that store and execute various software modules. The RE also comprises communication transceivers, such as antennas, ports, bus interfaces, signal processors, memory, and software. The RE in LTE relay 410 is capable of exchanging signaling and data with donor eNodeB 420 using D2UE CA. For example, backhaul data is transferred from the RE in LTE relay 410 to donor eNodeB 420 and user data and the modified CA thresholds are received from donor eNodeB 420 to LTE relay 410.

The Ethernet switch is capable of communicating user data with external entities using communication links, such as a Data Over Cable Service Interface Specification (DOCSIS), Ethernet, WiFi, Wavelength Division Multiplexing (WDM), Time Division Multiplexing (TDM), Internet Protocol (IP), and the like. The Ethernet switch also exchanges data between the relay eNodeB and the RE within LTE relay 410. For example, the Ethernet switch transfers the modified CA thresholds from the RE to the relay eNodeB within LTE relay 410.

The relay eNodeB in LTE relay 410 comprises communication transceivers, such as antennas, ports, bus interfaces, signal processors, memory, and software. The relay eNodeB is capable of exchanging signaling and data with UEs 401-402 using R2UE CA. The relay eNodeB also contains a CA scheduling component which processes CA thresholds to determine CA configurations for UEs 401-402. As indicated in FIG. 4, the CA scheduling component determines the CA configurations by comparing a current buffer occupancy level to the buffer occupancy threshold. For example, the initial buffer occupancy threshold is 70% and the modified buffer occupancy threshold is 80%.

Figure 5:
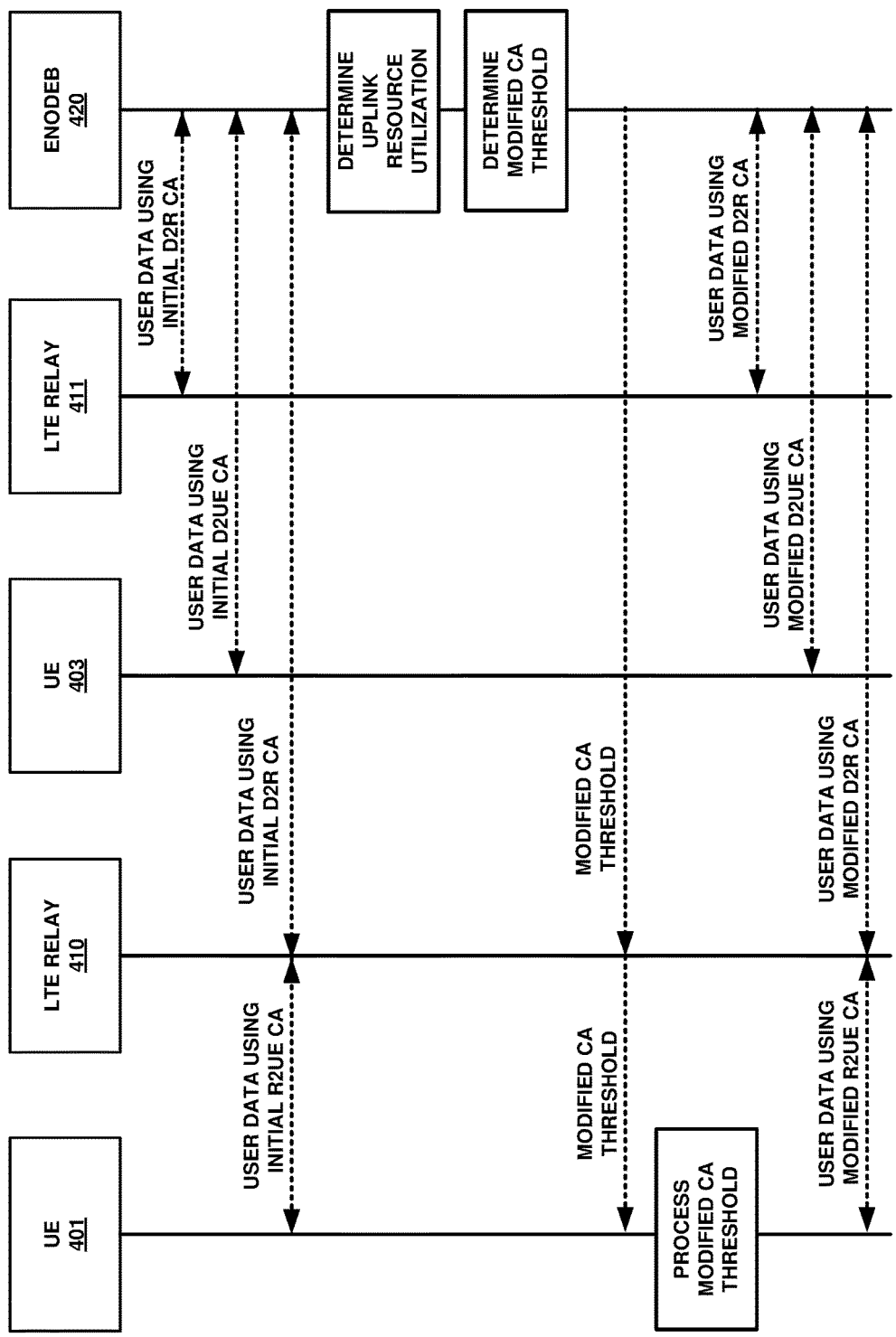

FIG. 5 illustrates a sequence diagram of LTE communication system 400 to control CA. In operation, donor eNodeB 420 exchanges user data with LTE relays 410-411 using CA based on an initial D2R CA threshold. Donor eNodeB 420 also exchanges user data with UE 402 using CA based on an initial D2UE CA threshold. LTE relay 410 exchanges user data with UE 401 using CA based on an initial R2UE CA threshold.

In a next operation, donor eNodeB 420 determines a donor eNodeB uplink resource utilization amount and processes the donor eNodeB uplink resource utilization amount to determine a modified D2R CA threshold, a modified D2UE CA threshold, and a modified R2UE CA threshold. Donor eNodeB 420 then wirelessly transfers an instruction to LTE relay 410 indicating the modified R2UE CA threshold. LTE relay 410 wirelessly receives the modified R2UE CA threshold and processes the modified R2UE CA threshold.

Donor eNodeB 420 exchanges additional user data with LTE relays 410-411 using CA based on the modified D2R CA threshold. Donor eNodeB 420 also exchanges additional user data with UE 403 using CA based on the modified D2UE threshold. In response to receiving additional user data from donor eNodeB 420, LTE relay 410 exchanges additional user data with UE 401 using CA based on the modified R2UE CA threshold.

Figure 6:
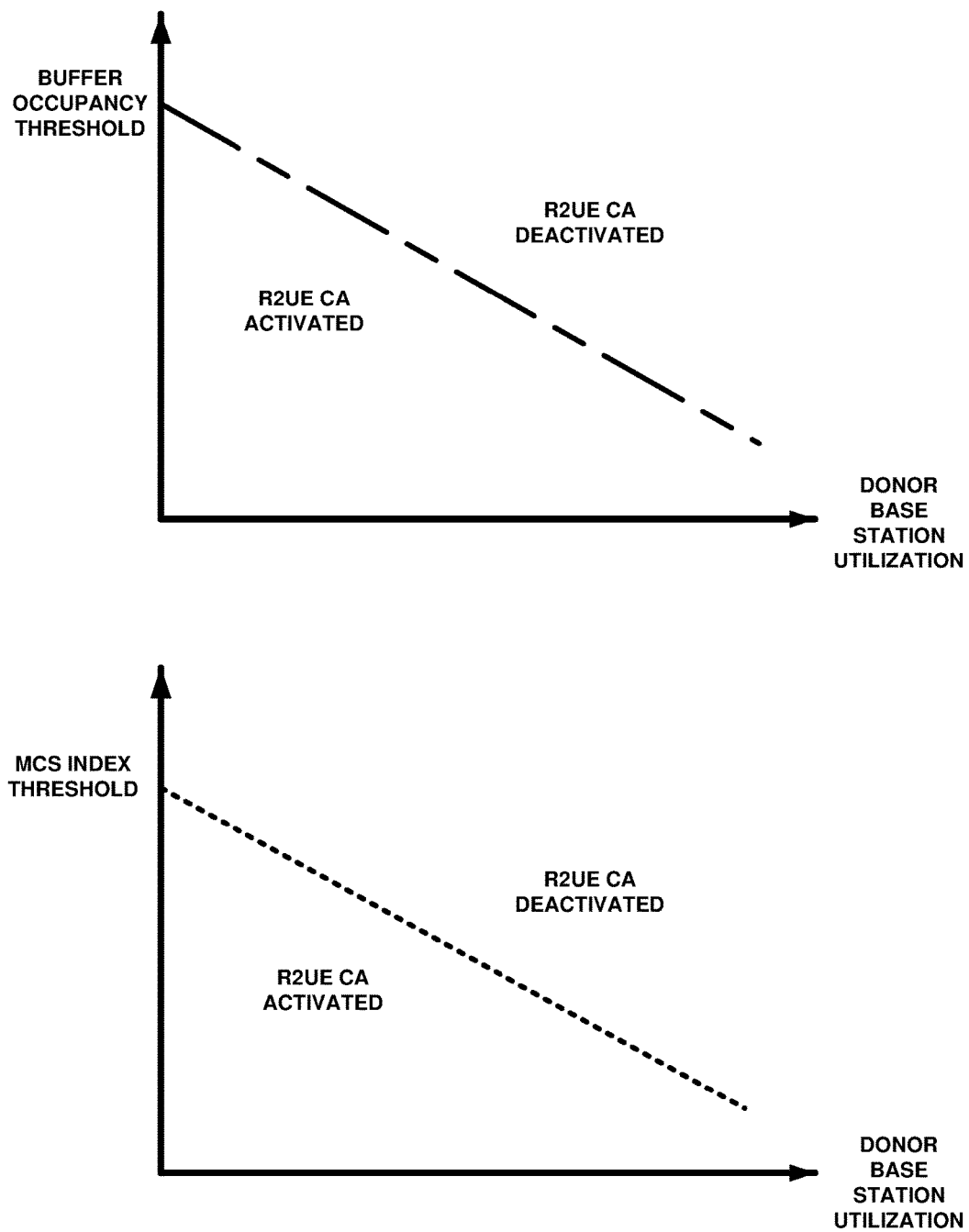
FIG. 6 illustrates graphs to control CA based on CA thresholds.

FIG. 6 illustrates a graph of R2UE CA thresholds. As indicated on the top graph, when the buffer occupancy level is above the buffer occupancy threshold, the R2UE CA is deactivated and vice versa. As the donor base station utilization amount increases, the buffer occupancy threshold for the wireless relay decreases. Referring now to the bottom graph in FIG. 6, when the MCS index level is above the MCS index threshold, the R2UE CA is off. On the other hand, when the MCS index level is below the MCS index threshold, the R2UE CA is on. As the donor base station utilization amount increases, the MCS index threshold for the wireless relay decreases. Advantageously, as the donor base station because more heavily loaded, the wireless relay decreases the R2UE thresholds and deactivates the amount of R2UE CA used between the wireless relay and the UE.

Figure 7:
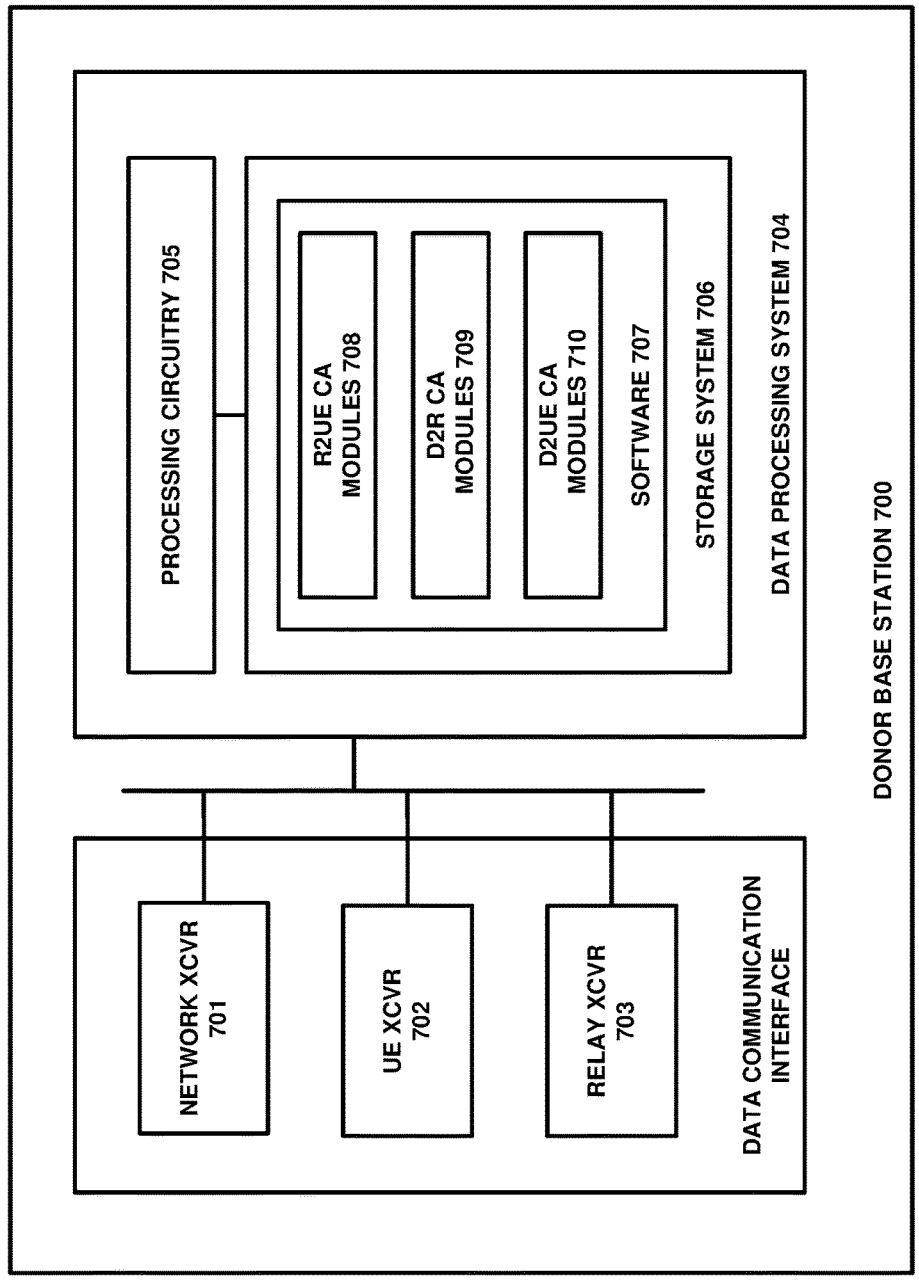
FIG. 7 illustrates a donor base station to control CA at a wireless relay.

FIG. 7 illustrates donor base station 700 to control CA for a relay. Donor base station 700 is an example of donor base station 120 and donor eNodeB 420, although donor base station 120 and donor eNodeB 420 may use alternative configurations and operations. Donor base station 700 includes a data communication interface system comprising network transceiver 701, UE transceiver 702, and relay transceiver 703. Donor base station 700 also contains data processing system 704. Data processing system 704 is linked to network transceiver 701, UE transceiver 702, and relay transceiver 703.

Network transceiver 701, UE transceiver 702, and relay transceiver 703 comprise communication components, such as antennas, ports, amplifiers, filters, modulators, signal processors, and the like. Network transceiver 701 may be configured to use TDM, IP, Ethernet, WDM, SONET, communication signaling, wireless communications, or some other communication format—including improvements thereof. UE transceiver 702 and relay transceiver 703 may be configured to use LTE, CDMA, OFDMA, LWA, IP, WiFi, or some other wireless communication format—including combinations thereof. Network transceiver 701 may be configured to receive user data from a data communication network. UE transceiver 702 may be configured to transfer user data to a UE using a D2UE CA. Relay transceiver 703 may be configured to transfer user data and a modified CA threshold to a wireless relay using a D2R CA.

Data processing system 704 includes processing circuitry 705 and storage system 706 that stores software 707. Processing circuitry 705 comprises a microprocessor and other circuitry that retrieves and executes software 707 from storage system 706. Storage system 706 comprises a non-transitory storage medium, such as a disk drive, flash drive, data storage circuitry, or some other memory apparatus. Software 707 comprises computer programs, firmware, or some other form of machine-readable processing instructions. Software 707 may further include an operating system, utilities, drivers, network interfaces, applications, or some other type of software. When executed by processing circuitry 705, software 707 directs processing system 704 to operate donor base station 700 as described herein.

When executed by processing circuitry 705, R2UE CA module 708 directs processing circuitry 705 to determine and process a donor base station utilization amount to determine a modified R2UE CA threshold. When executed by processing circuitry 705, R2UE CA module 708 also directs processing circuitry 705 to transfer an instruction to a wireless relay serving a UE indicating the modified R2UE CA threshold.

When executed by processing circuitry 705, D2R module 709 directs processing circuitry 705 to process the donor base station utilization amount to determine a modified D2R CA threshold. When executed by processing circuitry 705, D2R CA module 709 also directs processing circuitry 705 to exchange additional user data with the wireless relay using the CA based on the modified D2R CA threshold. When executed by processing circuitry 705, D2UE module 709 directs processing circuitry 705 to process the donor base station utilization amount to determine a modified D2UE CA threshold. When executed by processing circuitry 705, D2UE CA module 709 also directs processing circuitry 705 to exchange additional user data with the other UE using the CA based on the modified D2UE CA threshold.

Figure 8:
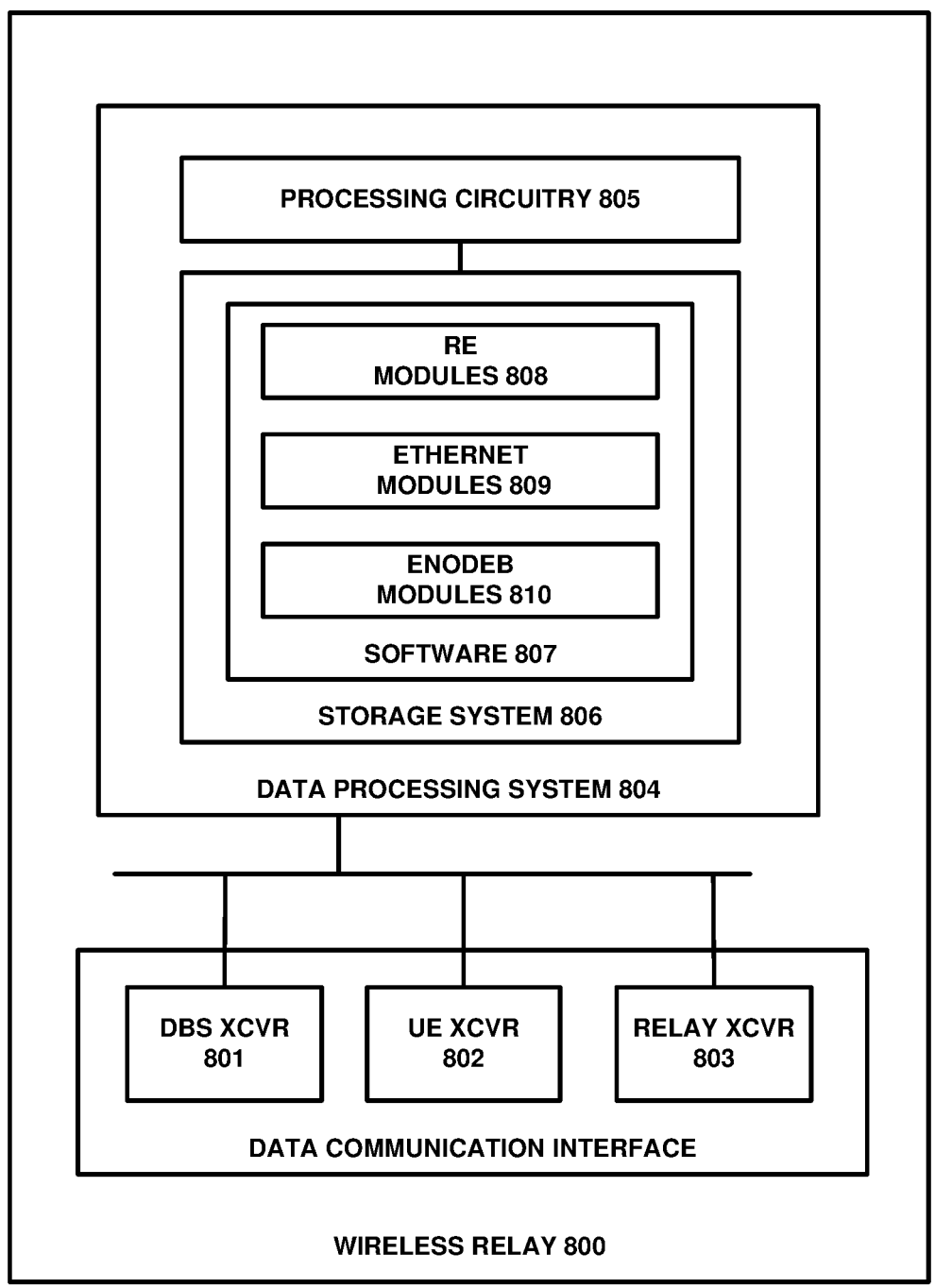
FIG. 8 illustrates a wireless relay to control CA.

FIG. 8 illustrates wireless relay 800 to control CA. Wireless relay 800 is an example of wireless relay 110 and LTE relay 410, although wireless relay 110 and LTE relay 410 may use alternative configurations and operations. Wireless relay 800 includes a data communication interface system comprising donor base station transceiver 801, UE transceiver 802, and relay transceiver 803. Wireless relay 800 also contains data processing system 804. Data processing system 804 is linked to donor base station transceiver 801, UE transceiver 802, and relay transceiver 803.

Donor base station transceiver 801, UE transceiver 802, and relay transceiver 803 comprise communication components, such as antennas, ports, amplifiers, filters, modulators, signal processors, and the like. Donor base station transceiver 801, UE transceiver 802, and relay transceiver 803 may be configured to use LTE, CDMA, OFDMA, LWA, IP, WiFi, or some other wireless communication format—including combinations thereof.

Donor base station transceiver 801 may be configured to wirelessly transfer user data and a modified CA threshold to a wireless relay using D2R CA. UE transceiver 802 may be configured to transfer user data to a UE using D2UE CA. Relay transceiver 803 may be configured to exchange user data with additional wireless relays in a wireless relay chain.

Data processing system 804 includes processing circuitry 805 and storage system 806 that stores software 807. Processing circuitry 805 comprises a microprocessor and other circuitry that retrieves and executes software 807 from storage system 806. Storage system 806 comprises a non-transitory storage medium, such as a disk drive, flash drive, data storage circuitry, or some other memory apparatus. Software 807 comprises computer programs, firmware, or some other form of machine-readable processing instructions. Software 807 may further include an operating system, utilities, drivers, network interfaces, applications, or some other type of software. When executed by processing circuitry 805, software 807 directs processing system 804 to operate wireless relay 800 as described herein.

When executed by processing circuitry 805, RE module 808 directs processing circuitry 805 to receive user data from a donor base station or wireless relay in a wireless relay chain. When executed by processing circuitry 805, RE module 808 also directs processing circuitry 805 to receive a modified CA threshold from a donor base station. When executed by processing circuitry 805, Ethernet module 809 directs processing circuitry 805 to transfer user data and the modified CA threshold from the RE in the wireless relay to the eNodeB in the wireless relay.

When executed by processing circuitry 805, eNodeB module 810 directs processing circuitry 805 to receive the user data and modified CA threshold from the RE in the wireless relay. When executed by processing circuitry 805 eNodeB module 810 also directs processing circuitry 805 to process the modified threshold level to determine a modified CA configuration for the exchange of additional user data with a UE. When executed by processing circuitry 805, eNodeB module 810 also directs processing circuitry 805 to exchange user data with a using based on a CA threshold.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a wireless communication network to control Carrier Aggregation (CA), wherein a donor base station wirelessly serves a wireless relay and the donor base station and the wireless relay wirelessly serve User Equipment (UE), the method comprising:
   the wireless relay wirelessly exchanging user data with a UE using CA based on an initial relay to UE (R2UE) CA threshold;
   the donor base station determining a donor base station utilization amount and processing the donor base station utilization amount to determine a modified R2UE CA threshold;
   the donor base station wirelessly transferring an instruction to the wireless relay indicating the modified R2UE CA threshold; and
   the wireless relay wirelessly receiving the modified R2UE CA threshold and exchanging additional user data with the UE using CA based on the modified R2UE CA threshold.

2. The method of claim 1 wherein:
   the wireless relay comprises a wireless Relay UE (RE) and a wireless relay evolved NodeB (eNodeB);
   the wireless relay wirelessly receiving the modified R2UE CA threshold and exchanging additional user data with the UE using CA based on the modified R2UE CA threshold comprises the RE receiving the modified R2UE CA threshold, the RE transferring the modified R2UE CA threshold to the wireless relay eNodeB, and the wireless relay eNodeB exchanging additional user data with the UE using CA based on the modified R2UE CA threshold.

3. The method of claim 2 wherein the RE transfers the modified R2UE CA threshold to the wireless relay eNodeB over an Ethernet link.

4. The method of claim 1 further comprising:
the donor base station wirelessly exchanging user data with another UE using CA based on an initial donor base station to UE (D2UE) CA threshold;
the donor base station processing the donor base station utilization amount to determine a modified D2UE CA threshold; and
the donor base station wirelessly exchanging additional user data with the other UE using CA based on the modified D2UE CA threshold.

5. The method of claim 1 further comprising:
the donor base station wirelessly exchanging user data with the wireless relay using CA based on an initial donor base station to relay (D2R) CA threshold;
the donor base station processing the donor base station utilization amount to determine a modified D2R CA threshold; and
the donor base station wirelessly exchanging additional user data with the wireless relay using CA based on the modified D2R CA threshold.

6. The method of claim 1 wherein the initial R2UE CA threshold comprises an initial buffer occupancy threshold for CA and the R2UE CA threshold comprises a modified buffer occupancy threshold.

7. The method of claim 1 wherein the initial R2UE CA threshold comprises an initial Modulation and Coding Scheme (MCS) index threshold for CA and the modified R2UE CA threshold comprises a modified MCS index threshold for CA.

8. The method of claim 1 wherein the initial R2UE CA threshold comprises an initial Channel Quality Indicator (CQI) threshold for CA and the modified R2UE CA threshold comprises a modified CQI threshold for CA.

9. The method of claim 1 wherein the donor base station comprises a Long Term Evolution (LTE) evolved NodeB (eNodeB).

10. The method of claim 1 wherein the wireless comprises a Long Term Evolution (LTE) evolved NodeB (eNodeB).

11. A wireless communication network to control Carrier Aggregation (CA), wherein a donor base station wirelessly serves a wireless relay and the donor base station and the wireless relay wirelessly serve User Equipment (UE), the wireless communication network comprising:
the wireless relay configured to wirelessly exchange user data with a UE using CA based on an initial relay to UE (R2UE) CA threshold;
the donor base station configured to determine a donor base station utilization amount and process the donor base station utilization amount to determine a modified R2UE CA threshold;
the donor base station configured to wirelessly transfer an instruction to the wireless relay indicating the modified R2UE CA threshold; and
the wireless relay configured to wirelessly receive the modified R2UE CA threshold and exchange additional user data with the UE using CA based on the modified R2UE CA threshold.

12. The wireless communication network of claim 11 wherein:
the wireless relay comprises a wireless Relay UE (RE) and a wireless relay evolved NodeB (eNodeB);
the wireless relay configured to wirelessly receive the modified R2UE CA threshold and exchange additional user data with the UE using CA based on the modified R2UE CA threshold comprises the RE configured to receive the modified R2UE CA threshold, the RE configured to transfer the modified R2UE CA threshold to the wireless relay eNodeB, and the wireless relay eNodeB configured to exchange the additional user data with the UE using CA based on the modified R2UE CA threshold.

13. The wireless communication network of claim 12 wherein the RE is configured to transfer the modified R2UE CA threshold to the wireless relay eNodeB over an Ethernet link.

14. The wireless communication network of claim 11 further comprising:
the donor base station configured to wirelessly exchange user data with another UE using CA based on an initial donor base station to UE (D2UE) CA threshold;
the donor base station configured to process the donor base station utilization amount to determine a modified D2UE CA threshold; and
the donor base station configured to wirelessly exchange additional user data with the other UE using CA based on the modified D2UE CA threshold.

15. The wireless communication network of claim 11 further comprising:
the donor base station configured to wirelessly exchange user data with the wireless relay using CA based on an initial donor base station to relay (D2R) CA threshold;
the donor base station configured to process the donor base station utilization amount to determine a modified D2R CA threshold; and
the donor base station configured to wirelessly exchange additional user data with the donor base station using CA based on the modified D2R CA threshold.

16. The wireless communication network of claim 11 wherein the initial R2UE CA threshold comprises an initial buffer occupancy threshold for CA and the modified R2UE CA threshold comprises a modified buffer occupancy threshold.

17. The wireless communication network of claim 11 wherein the initial R2UE CA threshold comprises an initial Modulation and Coding Scheme (MCS) index threshold for CA and the modified R2UE CA threshold comprises a modified MCS index threshold for CA.

18. The wireless communication network of claim 11 wherein the initial R2UE CA threshold comprises an initial Channel Quality Indicator (CQI) threshold for CA and the modified R2UE CA threshold comprises a modified CQI threshold for CA.

19. The wireless communication network of claim 11 wherein the donor base station comprises a Long Term Evolution (LTE) evolved NodeB (eNodeB).

20. The wireless communication network of claim 11 wherein the wireless comprises a Long Term Evolution (LTE) evolved NodeB (eNodeB).

* * * * *